United States Patent [19]

Shimada et al.

[11] 4,050,313
[45] Sept. 27, 1977

[54] SEMICONDUCTOR PRESSURE TRANSDUCER

[75] Inventors: Satoshi Shimada; Kazuji Yamada; Yasumasa Matsuda, all of Hitachi; Ichiro Kimura, Mito; Michitaka Shimazoe, Hitachi; Yukio Takahashi, Katsuta, all of Japan

[73] Assignee: Hitachi, Ltd., Japan

[21] Appl. No.: 692,368

[22] Filed: June 3, 1976

[30] Foreign Application Priority Data

June 4, 1975 Japan .................................. 50-66449
June 4, 1975 Japan .................................. 50-66450

[51] Int. Cl.² .............................................. G01L 9/06
[52] U.S. Cl. ......................... 73/398 AR; 73/88.5 SD; 338/4
[58] Field of Search .................. 73/88.5 SD, 398 AR; 338/4, 42

[56] References Cited

U.S. PATENT DOCUMENTS

| 3,071,745 | 1/1963 | Stedman | 73/398 AR X |
| 3,456,226 | 7/1969 | Vick | 73/88.5 SD X |
| 3,537,319 | 11/1970 | Yerman | 338/4 X |
| 3,641,812 | 2/1972 | Vick | 73/88.5 SD |
| 3,772,628 | 11/1973 | Underwood et al. | 73/88.5 SD X |

OTHER PUBLICATIONS

V. Vaganov et al. "Properties of Diffusion Strain-Gauge Resistances of Pressure Transducers with Silicon Diaphragms"-Measurement Techniques-Dec. 1973.

Primary Examiner—Charles A. Ruehl
Attorney, Agent, or Firm—Craig & Antonelli

[57] ABSTRACT

A semiconductor pressure transducer comprises a circular diaphragm formed of a single crystal semiconductor material, at least a first strain gauge element having a piezoresistance effect and formed by injecting an impurity into the diaphragm in a linear region extending in parallel with a predetermined axis which extends transversely of the surface of the diaphragm, at least a second strain gauge element having the piezoresistance effect and formed by injecting an impurity into the diaphragm in a linear region extending in the direction perpendicular to the axis, and means for securing the diaphragm at the outer peripheral portion thereof. The distance between the second strain gauge element and the center of the diaphragm is differed from the distance between the center of the first strain gauge element and the latter.

9 Claims, 13 Drawing Figures

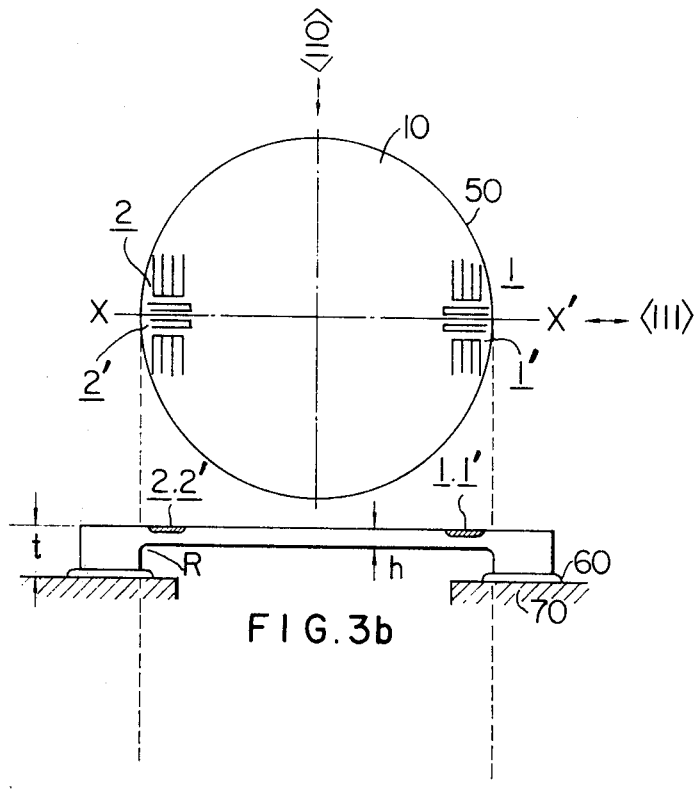
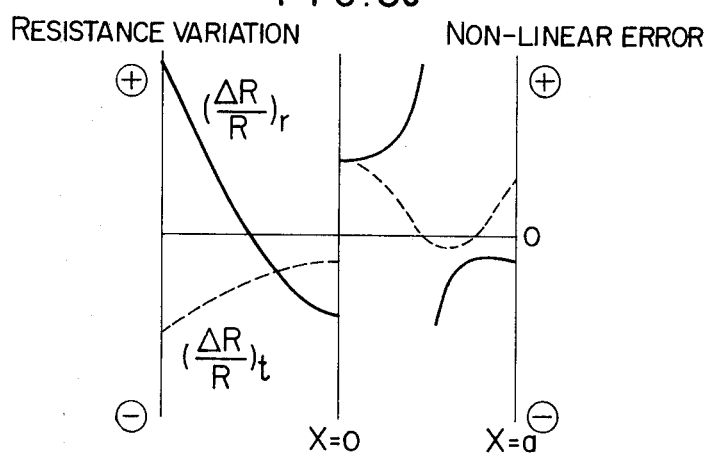

RESISTANCE VARIATION   NON-LINEAR ERROR

SEMICONDUCTOR PRESSURE TRANSDUCER

BACKGROUND OF THE INVENTION

1. Field of the Invention

The present invention relates to a semiconductor pressure transducer apparatus comprising strain gauge elements which are formed integrally in a diaphragm of a single crystal of such as silicon (Si) by injecting an impurity into the diaphragm at one surface thereof so as to exhibit a piezoresistance effect.

2. Desciption of the Prior Art

As is known in the art, when a circular diaphragm surface is formed by slicing or cutting a semiconductor single crystal which is made to exhibit a piezoresistance effect through the injection of an impurity, there exists at least one crystallographic axis along which the maximum piezoresistance effect is produced, although the magnitude thereof may vary depending on the crystal plane forming the diaphragm surface.

It is also known that, in the case of strain gauge formed of a semiconductor material injected with a P-type impurity, the static characteristic of change in the piezoresistance as a function of strain or stress is such that the piezoresistance is increased with increasing tensile stress such that the rate of resistance increasing is gradually increased, while for the compressive stress the piezoresistance is decreased with increasing compressive stress such that the rate of resistance decreasing is gradually decreased, that is, following a saturation characteristic.

Generally, the non-linearity of the strain-resistance characteristic of a strain gauge element is classified into two different types, that is, a negative non-linear characteristic in which the rate of resistance increasing becomes larger as the strain increases and a positive non-linear characteristic in which the rate of resistance increasing becomes smaller as the strain increases.

Back to the prior art, by taking advantage of the above-mentioned phenomenon, the linearity of the static resistance change characteristic of the strain gauge device has hitherto been improved by combining a pair of strain gauge elements whose resistances are changed oppositely to each other in a so-called bridge circuit so that the non-linearities in change of the piezoresistances of the individual gauge elements may be compensated by each other.

Furthermore, it has also been proposed that the pressure-responsive section of a strain gauge diaphragm is made by a semiconductor crystal to have a surface constituting a crystal plane such as (100) of the semiconductor crystal, and a first strain gauge element is formed on the diaphragm surface by injecting an impurity in a linear region extending on the surface in parallel with a crystallographic axis (110) along which a maximum piezoresistance effect is produced, while a second strain gauge element is formed by injecting an impurity in a linear region extending in the direction normal to the crystallographic axis (110) along which a maximum piezoresistance effect is also produced; herein the first and second strain gauge elements are located with an equal radial distance from the center of the circular diaphragm thereby to obtain the same resistance change for both the gauge elements. For example, reference is made to an article entitled "Solid State Digital Pressure Transducers" of IEEE Vol. ED-6, No. 10, pp. 867 et seq. Oct. 1969.

In connection with the hitherto known strain gauge devices such as described above, it should be noted that the prior art strain gauge device has not improved the non-linearity in stress-resistance characteristic of each strain gauge element at all, but has allowed a great non-linearity of each of the gauge elements. With such an arrangement, however, restriction will be inevitably imposed on the degree of attainable compensation. If there is even a little difference between the individual gauge elements in respect of the piezoresistance effects thereof, unsatisfactory compensation will result, involving errors in the measurements. For this reason, the strain gauge diaphragm of the known structure can not be reliably employed in a transducer for measurement of pressure or differential pressure, if a high accuracy is required.

SUMMARY OF THE INVENTION

The present invention contemplates to eliminate the disadvantages of the hitherto known semiconductor pressure transducers and improve effectively the non-linearity in the response characteristic of the strain gauge device.

After repeated experiments of the non-linearity of the stress-resistance characteristics of many strain gauge elements as formed in the above-mentioned manner, the inventors of the present application have found that the linearity in change of the piezoresistance caused by stress applied to a strain gauge element will undergo variations dependent of whether the directions of current and stress applied to the strain gauge element are parallel or normal to each other. It has also been ascertained that the non-linearity term in the stress-resistance characteristic of a gauge element can be minimized by applying to the strain gauge element a stress which has a suitable value of the ratio between its component in the longitudinal direction of the element and its component normal to the longitudinal direction. The present invention is based on such a principle and is aimed at assuring the compensation of the non-linearities of the gauge elements.

The objects, novel features and advantages of he invention will become more apparent from the detailed description of preferred embodiment of the invention. The description makes reference to the accompanying drawings.

BRIEF DESCRIPTION OF THE DRAWINGS

FIG. 1b graphically shows resistance change characteristics at given stresses and the non-linearity thereof for the strain gauge elements employed in the strain gauge shown in FIG. 1a.

FIGS. 3a, 3b and 4a show other embodiments of the strain gauge device according to the invention.

FIGS. 3c and 4b illustrate graphically the resistance change characteristics and the non-linearity thereof for predetermined stresses in the individual gauge elements employed in the structures shown in FIGS. 3a and 4a, respectively.

FIG. 5 is an enlarged fragmental view of a main portion of the structure shown in FIG. 3a.

FIG. 6 is an enlarged fragmental view of a main portion of the structure shown in FIG. 4a.

DESCRIPTION OF THE PREFERRED EMBODIMENTS

Figure 1A:
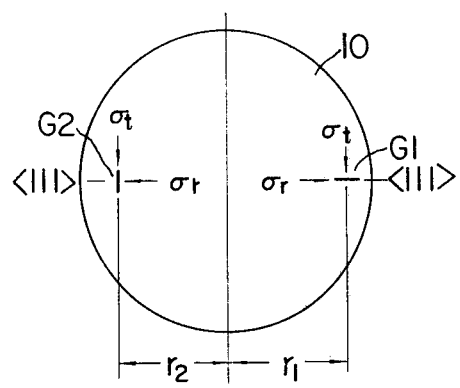
FIG. 1a is a schematic diagram of a semiconductor strain gauge to illustrate the fundamental principle of the invention.

As hereinbefore described, the inventors of the application have experimentally found that the linearity of the resistance change of a strain gauge element in response to the applied stress will be varied in dependence on whether the current direction and the stress direction as applied to the gauge element are parallel or normal to each other. This phenomenon will first be mathematically analyzed hereinafter. It is assumed that a stress $\sigma$ is developed on a surface of a circular diaphragm made of silicon in an accurate proportion to a pressure applied to the diaphragm surface in the direction perpendicular thereto. The rate of resistance change $\Delta R/R$ of a strain gauge element formed in the diaphragm can be approximated with negligible error by the following equation (1)

$$\frac{\Delta R}{R} = \pi_{\parallel}\sigma_{\parallel} + K_{\parallel}\sigma_{\parallel}^2 + \pi_{\perp}\sigma_{\perp} + K_{\perp}\sigma_{\perp}^2 \quad (1)$$

where $\sigma$, $90$ and $K$ indicate the stress applied to the strain gauge element, piezoresistance coefficient, and transformation coefficient, respectively and suffixes "$\parallel$" and "$\perp$" represent components parallel and perpendicular to the gauge element, respectively. The values of $\pi_{\parallel}$ and $\pi_{\parallel}$ are dependent on what crystal plane constitutes the diaphragm surface and what crystal axis the longitudinal direction of the gauge element assumes. As is seen from the equation, the rate of the resistance change $\Delta R/R$ includes a linear term of the stress $\sigma$ with a piezoresistance coefficient $\pi$ and a quadratic term of the stress $\sigma$ with a transformation coefficient K. For the particulars, reference should be made to "JOURNAL OF APPLIED PHYSICS," Vol. 32, No. 10, Oct. 1961, pp. 2008 et seq. For example, when the longitudinal direction of the strain gauge element is chosen to be parallel to the <111> axis and normal to the <110> axis and electric current is supplied to flow in the longitudinal direction of the gauge element, $\pi_{\parallel}$ and $\pi_{\perp}$ are respectively given by $$\pi_{\parallel} = \frac{1}{3}(\pi_{11} + \pi_{12} + 2\pi_{44}), \text{ and}$$

$$\pi_{\perp} = \frac{1}{3}(\pi_{11} + 2\pi_{12} - \pi_{44}).$$

In case of a strain gauge element being formed by diffusing a P-type impurity into the diaphragm of Si semiconductor, $\pi_{44} >> \pi_{11}, \pi_{12}$. Accordingly, the above expression may be rewritten as follows:

$$\pi_{\parallel} \approx \frac{2}{3}\pi_{44}, \text{ and}$$

$$\pi_{\perp} \approx -\frac{1}{3}\pi_{44}$$

Thus, through the substitution, the equation (1) can be expressed as follows:

$$\frac{\Delta R}{R} = \frac{1}{3}\pi_{44}(2\sigma_{\parallel} - \sigma_{\perp}) + (K_{\parallel}\sigma_{\parallel}^2 + K_{\perp}\sigma_{\perp}^2) \quad (2)$$

wherein $\sigma_{\parallel}$ and $\sigma_{\perp}$ represent the components of the stress $\sigma$ applied to the gauge element in the longitudinal direction thereof and normal thereto, respectively. The first term of the equation (2) is a linear term of the stress, while the second term is a qudratic or non-linear term of the stress. These terms are functions of the gauge element position $r$ which corresponds to the distance between the gauge element and the center of the circular diaphragm, since the stresses $\sigma_{\parallel}$ and $\sigma_{\perp}$ are functions of the position $r$. It has been experimentally ascertained that $|K_{\parallel}| < |K_{195}|$. This means that the non-linear characteristics of the resistance change can be minimized by selecting the ratio between $\sigma_{\parallel}$ and $\sigma_{\perp}$ at an appropriate value through the corresponding selection of the position of the gauge element.

Figure 1B:
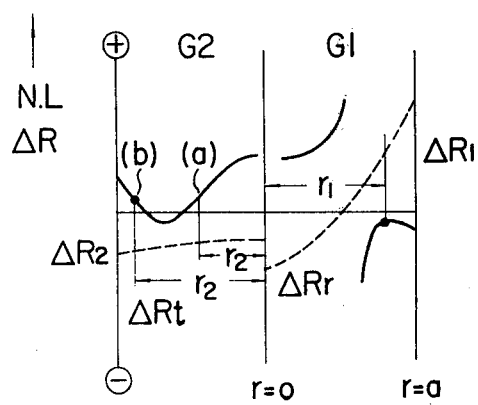

To explain in more detail, reference is to be made to FIGS. 1a and 1b. In FIG. 1a, the distance $r_1$ is the distance between the center of the circular diaphragm and the center of the strain gauge element $G_1$ having the longitudinal axis extending in parallel to the crystallographic axis <111> along which a maximum piezoresistance effect is provided. This means that the piezoresistance effect should decrease if the direction of the gauge element deviates slightly from the <111>. Another strain gauge element $G_2$ having the longitudinal axis perpendicular to the crystallographic axis <111> is located at a distance $r_2$ from the center of the diaphragm. In such an arrangement, the gauge elements $G_1$ and $G_2$ are each subjected to a radial stress $\sigma_r$, and a tangential stress $\sigma_t$, when the diaphragm undergoes a pressure P normal to the surface thereto as shown in FIG. 2b. Since the stresses $\sigma_r$ and $\sigma_t$ are functions of the positions $r_1$ and $r_2$, the linear and the quadratic terms of $\sigma$ of the equations (1) and (2) will be varied as functions of the distances $r_1$ and $r_2$. Hereinafter, we use the ratio of the quadratic term of $\sigma$ to the linear term thereof in the equations (1) and (2) to numerically represent the non-linearity (N·L) of the stress-resistance characteristics. Then the relationships of the value N·L and resistance changes $\Delta R_1$, $\Delta R_2$ relative to the positions $r_1$, $r_2$ of the strain gauge elements $G_1$ and $G_2$ arrayed in the manner shown in FIG. 1a will be such as shown in FIG. 1b, in which the positions $r_1$ and $r_2$ of the elements $G_1$ and $G_2$ are taken along the abscissa and $a$ represents the radius of the diaphragm.

It should be noted that according to the present invention, the ratio between the stresses $\sigma_{\parallel}$ and $\sigma_{\perp}$ is selected at an optimum value thereby to minimize, or make as small as possible the non-linear term by suitably selecting the locations of the gauge elements $G_1$ and $G_2$.

By the way, examination will be made to the case in which the equation (2) is applied to a strain gauge device having a circular diaphragm secured along the periphery thereof. When the gauge element $G_1$ is oriented in the radial direction, then $\sigma_{\parallel} = \sigma_r$ and $\sigma_{\perp} = \sigma_t$. If the diaphragm surface is constituted by the crystal plane (211) and the longitudinal direction of the element $G_1$ corresponds to the crystal axis <111> or perpendicular to <110>, $\pi_{\parallel} = 2/3 \pi_{44}$ and $\pi_{\perp} = 1/3 \pi_{44}$ are given. In the case of the diffused stain gauge element formed by injecting P-type impurity such as boron into an N-type silicon semiconductor diaphragm of Si with an impurity concentration of $10^{19}/cm^3$, it has been found that the non-linearity of the stress-resistance change characteristic of the gauge element takes a pattern of distribution with respect to its position or distance from the center of the diaphragm such as shown in FIG. 1b. In other words, the strain gauge $G_1$ having a minimum non-linearity in the stress-resistance change characteristic can be obtained, when the gauge element $G_1$ is formed through the impurity diffusion at the position $r_1$ where the absolute value of the non-linear term of a equation (2) becomes the minimum. To the same effect, the gauge element $G_2$ oriented in the tangential direction should be formed through the impurity diffusion at the position $r_2$ where the value representing the non-linearity of the stress-resistance change characteristic of the element $G_2$ is equal in its absolute value to and opposite in its sign indicating positive or negative to that of the gauge element $G_1$. The gauge elements $G_1$ and $G_2$ are then connected in a bridge circuit, whereby a strain gauge device having greatly improved stress-resistance change characteristics can be accomplished.

For example, in order that the non-linearity of less than 1% be attained in the pressure range which gives rise to the radial strain $(\Delta l/l)$ in the range of 0 to 600 × $10^{-6}$, the positions or distances $r_1$ and $r_2$ from the center of the circular diaphragm of the gauge elements $G_1$ and $G_2$ are selected such that $r_1/a$ is in the range of 0.75 to 1.0 and $r_2/a$ is from 0.3 to 0.85.

Since the non-linearities of the resistance change characteristics of the radially oriented element $G_1$ and the tangentially oriented element $G_2$ are opposite in the sign, indicating positive or negative values, in a specific range of the distances as can be seen from FIG. 1b, it is possible, by locating these elements $G_1$ and $G_2$ at selected positions in the range where the absolue values of the non-linearities become equal to each other and as small as possible and by connecting them in the form of the well know Wheatstone bridge, to cancel out the non-linearities of the strain gauge elements as mesured at the output side of the bridge circuit by each other thereby to improve the linearity of the gauge system.

As can be seen from the graph illustrated in the lower half part of FIG. 1b, when the gauge element $G_1$ is located at the position spaced apart by $r_1$ from the center of the diaphragm, the position of the gauge element $G_2$ a distance $r_2$ from the center of the diaphragm which permits the desired compensation of the non-linearity value N·L described above will be at a point $a$ near to the center of the diaphragm or a remote point $b$.

Figure 2A:
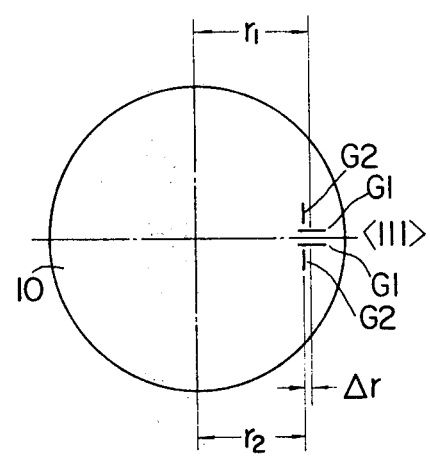
FIGS. 2a and 2b show an arrangement of a strain gauge device according to an embodiment of the invention.
Figure 2B:
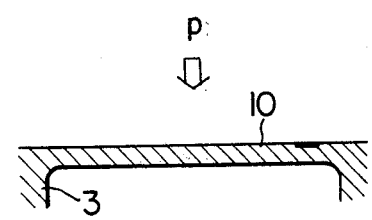

It is also possible to locate the gauge elements $G_1$ and $G_2$ at the same side of the center of the diaphragm as shown in FIG. 2a.

By way of an example, with $r_1/a = 0.85$ and $r_2/a = 0.80$, the non-linearity of the resistance change of the gauge element can be minimized below 1.00% for the radial strain variable in the range of 0 to 600 × $10^{-6}$. When these gauge elements $G_1$ and $G_2$ are combined into a bridge circuit energized by a constant voltage thereby to construct a strain gauge device, the non-linear characteristic of the device can be further compensated below 0.25%. More particularly, when the combination of the elements $G_1$ and $G_2$ exhibits a negative non-linearity characteristic, that is, the rate of resistance change is increased as the strain increases, the element $G_1$ is located at a position which is far remote from the center of the diaphragm as compared with the position of the element $G_2$ such that $\Delta R_1 > |\Delta R_2|$ wherein $\Delta R_1$ and $\Delta R_2$ represent the amounts of the resistance changes of the elements $G_1$ and $G_2$, whereby the non-linear characteristic of the strain gauge bridge circuit can be compensated towards less negative non-linearity due to the impedance change measured at the input side of the circuit which is caused by the resistance changes of the gauge elements $G_1$ and $G_2$. This results in a strain gauge device having a highly improved linear characteristic. On the other hand, when the combination of the gauge elements $G_1$ and $G_2$ exhibits a positive non-linearity characteristic, that is, the resistance change rate is progressively decreased finally into a substantially zero i.e. a saturation characteristic, then the element $G_1$ is positioned nearer to the center of the diaphragm than the element $G_2$ such that $\Delta R_1 < |\Delta R_2|$, whereby the non-linear characteristic of the strain gauge circuit can be compensated towards a less positive non-linearity.

Whether the combination of the strain gauge elements exhibits a positive or negative non-linearity characteristic depends on the conduction type of the gauge elements, concentration of the impurity, the manner in which the diaphragm is secured at the periphery thereof and the displacement of the central section of the diaphragm. Particularly in the case of the diaphragm of the gauge device used for the measurement of a low pressure, the displacement of the central section of disphragm is not negligibly small with respect to the thickness of the pressure responsive portion of the diaphragm, that is, the membrane stress at the neutral section of the diaphragm is not negligibly small, resulting in a large non-linearity. In this connection, it is to be noted that the increased non-linearity due to the membrane stress at the neutral section is also effectively cancelled out according to the invention, which thus may be advantageously applied to a pressure transducer or transmitter having a high accuracy.

In an exemplary embodiment of the diaphragm of silicon semiconductor having the strain gauge elements formed through the impurity diffusion in the manner described above, following advantageous effects can be obtained:

1. The non-linearity in resistance change characteristic of the gauge element can be decreased to a small fraction of that of the conventional gauge.

2. When the radial and tangential gauge elements $G_1$ and $G_2$ are formed adjacent to each other in the vicinity of the periphery of the circular diaphragm with the distances from the center of the latter selected at $r_1$ and $r_2$ defined above, both the elements will be subjected to the substantially same thermal condition, as a result, the strain gauge device formed by connecting these gauge elements into a bridge circuit is substantially free from the error due to the temperature variation.

Figure 2C:
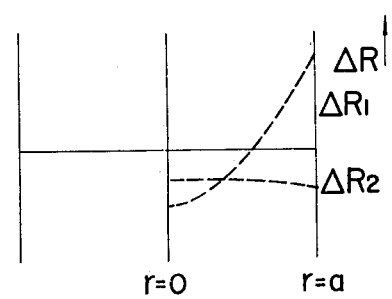
FIG. 2c graphically shows resistance change characteristics for predetermined stresses of the strain gauge elements employed in the arrangement shown in FIGS. 2a and 2b.

3. As can be seen from FIGS. 1b and 2c which show the relations between the resistance changes ($\Delta Rr$, $\Delta Rt$) and the positions of the radial and the tangential gauge elements ($G_1$, $G_2$), the gauge elements formed at the peripheral portion of the diaphragm have a higher sensitivity and a smaller non-linearity than those formed at the central portion thereof and also the rate of resistance change and the non-linearity of the radial element has opposite signs indicating negative or positive values to those of the tangential element if both the elements are formed at the peripheral portion. Owing to these features, the strain gauge device according to the invention has a higher sensitivity than the conventional one in which the gauge elements are located closer to the center portion of the diaphragm. Furthermore, by adjusting the distances of the gauge elements $G_1$ and $G_2$ from the center of the diaphragm, the resultant linear characteristic of the strain gauge bridge composed of these element can be significantly improved as compared with the conventional strain gauge device in which both the gauge elements are located at equal distances from the center of the diaphragm. Thus, the strain gauge device accordinng to the invention provides a great contribution to the implementation of a high precision type pressure or differential pressure transmitter or transducer.

4. In the case of the diaphragm for a low pressure sensing strain gauge in which the central portion of the diaphragm is likely to undergo a large displacement as compared with the thickness of the diaphragm, the non-linearity due to the so-called membrane stress can not be neglected. However, according to the invention, such non-linearity can be easily compensated.

In the above described embodiment, the face orientation of the circular diaphragm of single crystal Si is chosen as the crystallographic plane (211) and the axis orientation is selected in the direction of the crystallographic axes <111> <110>. However, it has been found that the same effects can be attained when the combination of the crystallographic plane (110) and the crystallographic axes <111> <112>, or the crystallographic plane (100) and the crystallographic axes <110> <110> is used.

FIGS. 3a to 3c illustrate another embodiment of the semiconductor pressure transducer according to the invention which is also prevented from adverse affects on the sensitivity and accuracy of the transducer by the positional dislocation of the gauge elements and the dimensional unevenness of the pressure-responsive portion due to manufacturing tolerances.

Referring to FIGS. 3a and 3b, when the surface of the diaphragm 10 of Si semiconductor crystal is chosen as the (211) plane, the radial gauge element $G_1$ is oriented in the <111> axis and the tangential gauge element is oriented in the <110> axis normal to the <111> axis. FIG. 3c shows the characteristics of the resistance change rate $\Delta R/R$ and the non-linearity with respect to the distance $r$ of the strain gauge elements of the above arrangement. In FIG. 3c, the curves of solid lines correspond to the radially oriented gauge element, while the curves of broken lines correspond to the tangentially oriented gauge. The radial distance $r$ is scaled along the abscissa. The rate of resistance change $\Delta R/R$ is taken along the left hand ordinate, while the non-linearity N L is taken along the right hand ordinate. As will be seen from FIG. 3c, the tangential gauge element as well as the radial gauge element should preferably be disposed near the peripheral portion of the diaphragm in order to achieve a higher sensitivity, i.e. a larger resistance change rate $\Delta R/R$ and an improved linearity, i.e. a higher accuracy of the strain gauge. Additionally, in order to prevent the sensitivity and the accuracy from being adversely affected by the positional dislocation of the gauge elements and the dimensional unevenness of the pressure-responsive portion, it is preferred that a plurality of the tangential gauge elements, whose non-linearity characteristics rise relatively sharply at the area of the peripheral portion of the diaphragm, are formed in a comb-like array as a gauge unit. With such an arrangement, it is possible to attain a desired linearity in the output signal of the strain gauge device by using a selected one of the tangential gauge elements which is capable of cancelling out the non-linearity of the radial gauge element and connecting them in a bridge circuit.

In this connection, it is to be noted that those characteristics as shown in FIG. 3c are greatly affected by the fitting structure for fixing the diaphragm along its peripheral portion, as hereinbefore described. The diaphragm of Si semiconductor is to be so processed that the thickness $h$ of the pressure-responsive portion is smaller than thickness $t$ of the fixed portion and preferably $t \geqq 10h$ so that the pressure-responsive section of the diaphragm is distinctively defined inside the thicker fixed portion which is secured to a frame 70 by a bonding material 60, as shown in FIG. 3b. To the end, a plate of Si semiconductor having a thickness $t$ is prepared, a recess is formed in one side of the plate at the portion thereof corresponding to the pressure-responsive portion, and then the gauge elements are accurately formed at predetermined positions in the opposite side of the plate.

In the manufacturing process, a plate of N-type silicon semiconductor material having a thickness $t$ is formed with a recess through an ultrasonic wave treatment, for example, so as to retain a thin portion corresponding to the pressure-responsive portion of the thickness $h$. Thereafter, the locations at which the gauge elements 1, 1', 2 and 2' are to be formed are determined at the surface opposite to the recessed side with reference to the position of the recess defining the pressure-responsive portion by using, for example, a dual-mask aligner. The individual gauge elements are formed through the diffusion of a P-type impurity. It is, however, noted that, since the recess defining the pressure-responsive portion and serving as the reference for the positioning of the gauge elements may not be finished with a high manufacturing accuracy, it is practically difficult to determine precisely the positions of the gauge elements relative to the peripheral fixed portion. This problem is especially serious when curvature R is provided at the boundary corner of the recess with a view to reinforcing the gauge structure. Under these conditions, it is very probable that the tangential gauge element whose non-linearity characteristic changes greatly at the peripheral portion of the diaphragm with variation of the distance $r$ as indicated by the broken curve in FIG. 3c is not provided with the desired non-linearity characteristic due to deviation of the distance. This in turn will involve difficulties in obtaining the sufficient linear characteristic of the output signal from the strain gauge device. The arrangement of the strain gauge diaphragm shown in FIG. 3a can advantageously solve the above problem. In more particular, taking advantage of the fact that the non-linearity characteristic of the radially oriented gauge element is relatively flat at the peripheral portion, a plurality of tangentially oriented gauge elements whose characteristics change sharply with the variation of the location and hence are apt to deviate from the desired linearity characteristic are arrayed in the comb-like configuration as shown in FIG. 3a and the selected ones of the tangential gauge elements having the desired non-linearity values N·L which will be cancelled out by that of the radial elements are incorporated in a bridge circuit, thereby to assure the linearity of the output signal from the strain gauge device.

Figure 5:
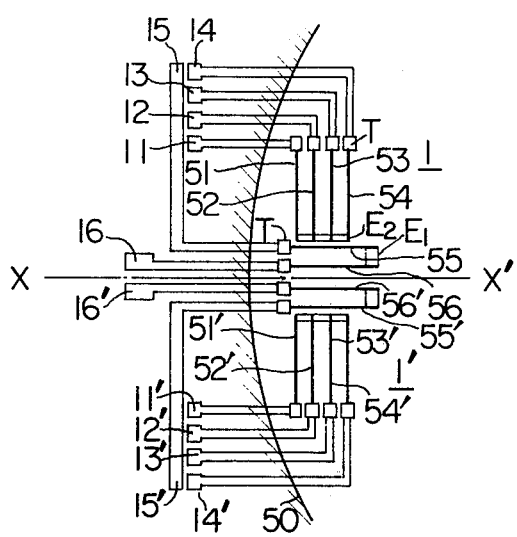

FIG. 5 shows in detail the arrangement of the radial and the tangential gauge element units 1 and 1' based on the above principle. In the gauge unit 1, the radially oriented gauge elements denoted by the reference numerals 55 and 56 in FIG. 5 are formed in the vicinity of the fixed portion 50 of the diaphragm in parallel with the axis X – X' and connected to a termination $E_1$ in a turned-back pattern. Reference symbol T represents terminals which have metal film electrodes 15 and 16 formed thereon through evaporation. These electrodes extend to the fixed portion. The tangentially oriented gauge elements 51, 52, 53 and 54 are formed as extending perpendicularly to the axis X – X' and connected to a termination $E_2$ which is electrically connected to the termination $E_1$ in a comb-like array so that the desired number of the tangential gauge elements may be selected in a turned-back pattern. Formed on the terminals are electrodes 11, 12, 13, and 14 which also extend to the fixed portion of the diaphragm. It is noted that these electrodes of the radial gauge elements are disposed adjacent to the electrode 15 of the tangential gauge elements 55 and 56 so as to facilitate the combination of the radial and the tangential gauge elements in a bridge circuit. It is noted that the other gauge unit 1' of the similar arrangement as the gauge unit 1 is provided in a symmetrical pattern to the latter in respect of the axis X – X' so that a four-element active bridge circuit may be constructed.

When there is dimensional uneveness in the contour of the pressure-responsive portion due to the manufacturing tolerance and hence the gauge elements 53 and 54 are off set excessively from the peripheral portion 50, the tangential gauge elements tend to exhibit negative non-linearity characteristics as indicated by the broken curve shown in FIG. 3c. Since the radial gauge elements also have negative non-linearity characteristics, the combination of the tangential and the radial gauge elements would result in a negative non-linearity characteristic. On the other hand, since the tangential gauge elements 51 and 52 are closer to the fixed portion, they will have positive non-linearity characteristics. Accordingly, under such a condition, the elements 51 and 52 are used to form a bridge circuit in combination with the radial gauge elements having negative non-linearity characteristics thereby to cancel out the non-linearities from each other. On the contrary, when the gauge unit 1 is positioned closer to the fixed portion 50, and the negative non-linearity characteristics of the tangential gauge elements 51 and 52 are too great to be sufficiently cancelled out by the position non-linearity characteristics of the radial elements, the tangential gauge elements 53 and 54 are used to form the bridge circuit in cooperation with the radial gauge elements, whereby the positive non-linearity characteristics of the later are cancelled out by the negative non-linearity characteristics of the tangential gauge elements 53 and 54. With the above arrangement of the strain gauge device, it has been found that the non-linearity value N·L of the gauge device can be decreased less than 0.25% in the full scale range of the device. It is thus possible to realize a high precision type pressure transmitter.

The fabrication of the pressure-responsive portion of the diaphragm of Si semiconductor, and the strain gauge elements requires many processing steps and is greatly time-consuming. Accordingly, if the gauge elements thus fabricated could not be combined into a strain gauge device having a desired non-linearity characteristic, the economical loss is intolerably large. In this conjunction, it will be understood that the arrangement of the strain gauge diaphragm according to the invention such as shown in FIGS. 3a and 5 allows the choice of desired elements which are capable of providing, when connected in a bridge circuit, a satisfactory linear characteristic of the output obtained from the bridge circuit, even if the diameter of the pressure-responsive portion of the diaphragm and/or the location of the gauge units 1, 1' and 2, 2' would be deviated from the original design. Hence, it is seldom that the desired gauge device cannot be achieved from the fabricated gauge elements. Accordingly, the yield of the finished strain gauge can be increased. When the mass productivity is to be enhanced, it is preferred to employ a minicomputer for selecting a combination of the gauge elements to assure the linear characteristic.

Figure 4A:
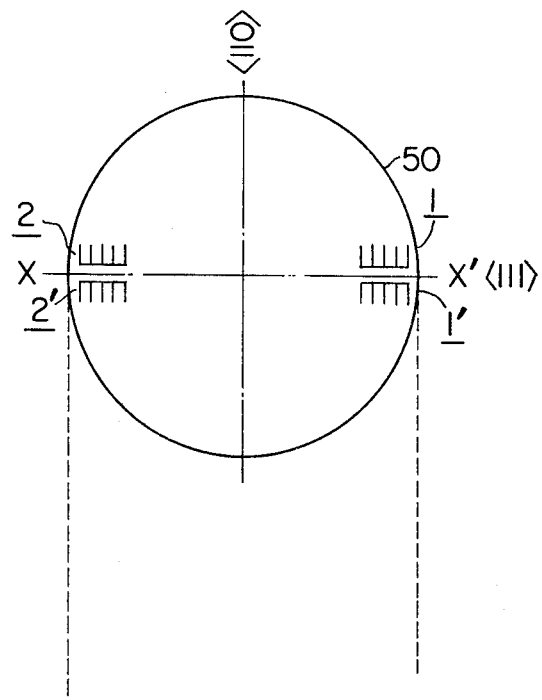
Figure 4B:
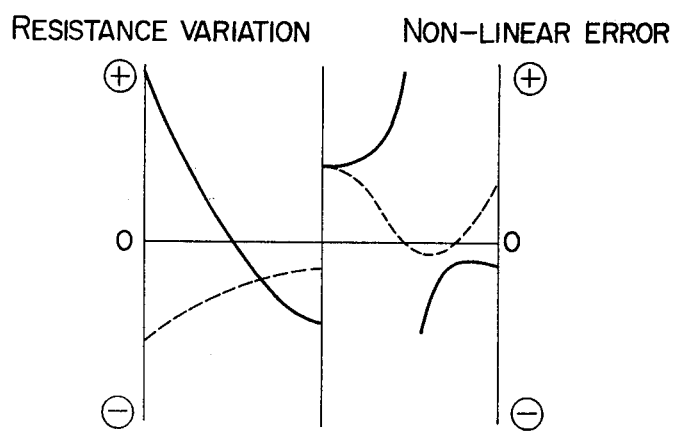
Figure 6:
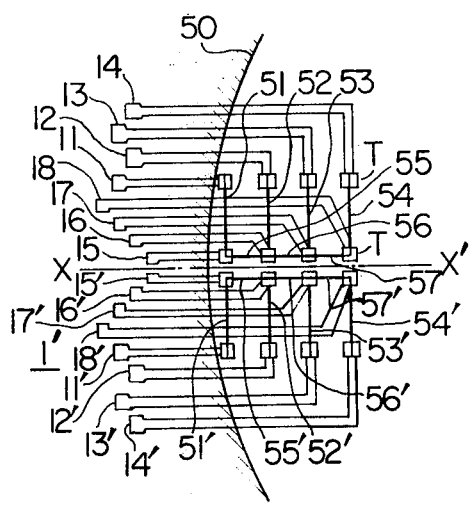

FIGS. 4a, 4b and 6 show another embodiment of the invention. Referring to FIG. 6, tangentially oriented gauge elements 51, 52, 53 and 54 are formed perpendicularly to the axis X – X', while radially oriented gauge elements 55, 56 and 57 are formed in parallel with the axis X – X'. The radial gauge elements 55 and 56 when connected to each other provide the same resistance value as that of the tangential gauge element 51. Accordingly, when these gauge elements 51, 55 and 56 are to be combined, the metal electrodes 11, 15 and 17 are used. If a four-element active bridge is to be formed, those strain gauge elements and terminals which are located in a symmetrical configuration relative to the axis X – X' are used. When the bridge circuit exhibits a positive non-linearity characteristic, the connection is changed and the tangential gauge element 52 is used in combination with the radial gauge elements 56 and 57 through the electrodes 12, 16 and 18. When the positive non-linearity characteristic is too great, the tangential gauge element 53 or 54 is employed. When the element 54 is selected, the radial gauge elements 56 and 57 are used together with the electrodes 14, 18 and 16. When the gauge elements are connected in a four-element active bridge, those elements and corresponding terminals which are located symmetrically with respect to the axis X – X' are used. Since the radial gauge elements have relatively flat non-linearity characteristics as shown in FIG. 4b, there will arise no significant differences in the compensating effect whether the radial gauge elements 55 and 56 or 56 and 57 are used. However, since the non-linearity value N·L of the tangential gauge elements 51, 52, 53 and 54 are substantially different from one another, the non-linear characteristic of the output signal of the strain gauge bridge circuit due to the dimensional error and the dislocation of the gauge unit can be suppressed within the order of 0.1 %.

Figure 7:
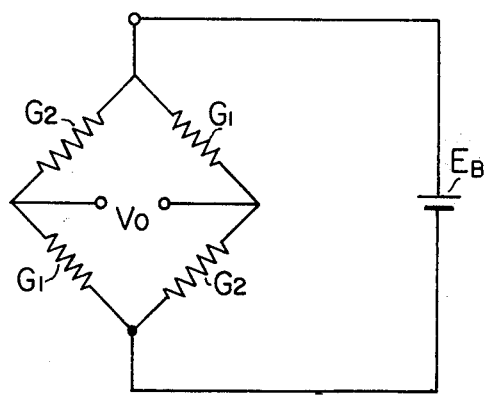
FIG. 7 shows a typical bridge circuit employed in the present invention.

The connection of the bridge circuit as mentioned hereinbefore is well known and hence will be understood without detailed explanation. FIG. 7 shows a typical one of such bridge circuits including a pair of radial gauge elements $G_1$ and $G_1'$ each having a resistance $RG_1$ and a pair of tangential gauge elements $G_2$ and $G_1'$ each having a resistance $RG_2$. The output voltage $V_0$ of the bridge circuit is given by $$V_0 = (RG_2 - RG_1)/(RG_1 + RG_2) E_B$$

where $E_B$ is a source voltage applied to the bridge circuit.

If the system includes only one radial gauge element $G_1$ and one tangential gauge element $G_2$, the bridge circuit is formed by replacing the elements $G_1'$ and $G_2'$ in FIG. 7 by fixed resistance elements.

Further the dimensions of a typical one of the devices as above-mentioned are shown as follows:

| | |
|---|---|
| Diameter of the diaphragm plate | 8 mm |
| Thickness of the diaphragm plate (h) | 150 μ |
| Thickness of the fixed portion of | |

-continued

| | |
|---|---|
| the device (t) | 1.5 mm |
| Length of each strain gauge element | 1 mm |
| Width of each strain gauge element | 30 μ |
| Distance between two adjacent elements | 70 μ |

However, it will be clear for those skilled in the art that the dimensions may be changed depending on the use of the device.

As will be appreciated from the foregoing description, the present invention has provided a novel structure of a semiconductor strain gauge for a pressure transducer in which the non-linear characteristic of the gauge elements as well as the gauge device can be effectively and reliable compensated.

We claim:

1. A semiconductor pressure transducer comprising a presure-responsive circular diaphragm made of a single crystal of semiconductor material, a first strain gauge unit including at least one strain gauge element formed by injecting an impurity into a linear region extending on a surface of said diaphragm in parallel with a predetermined crystallographic axis and having a piezoresistance effect, a second strain gauge unit including at least one strain gauge element formed by injecting an impurity into a linear region extending on said surface of said diaphragm perpendicularly to said axis and having a piezoresistance effect, and means for fixing said diaphragm at the outer peripheral portion thereof, wherein the gauge elements of said first and second gauge units are disposed such that the numerical value representing the non-linearity of the stress-resistance change characteristic of the gauge elements of said first gauge unit is substantially equal in its absolute value to and opposite in sign to the numerical value representing the non-linearity of the stress-resistance change characteristic of the gauge elements of said second gauge unit.

2. A semiconductor pressure transducer as set forth in claim 1, wherein said axis is so selected that the piezoresistance effect of the strain gauge element of said first gauge unit is at maximum in the direction of said axis.

3. A semiconductor pressure transducer as set forth in claim 1, wherein said first gauge unit includes a plurality of such strain gauge elements which are formed in spaced parallel relationship with each other.

4. A semiconductor pressure transducer as set forth in claim 1, further comprising means for combining the strain gauge element of said first gauge unit formed in the surface of said diaphragm with the straim gauge element of said second gauge unit in the form of a bridge circuit.

5. A semiconductor pressure transducer comprising a pressure-responsive circular diaphragm made of a single crystal of semiconductor material, a first gauge unit including at least one strain gauge element formed on said diaphragm and having a piezoresistance effect, said element being formed by injecting an impurity into a linear region extending on a surface of said diaphragm in parallel with a predetermined crystallographic axis, a second gauge unit including a plurality of strain gauge elements formed on a surface of said diaphragm in parallely spaced relationship with each other and each having a piezoresistance effect, each of the stain gauge elements of said second unit being formed by injecting an impurity into a linear region extending on said surface perpendicularly to said axis, said gauge elements of said first and second gauge units being disposed such that the the numerical value representing the non-linearity of the stress-resistance change characteristic of the gauge elements of said first gauge unit is substantially equal in its absolute value to and opposite in sign to the numerical value representing the non-linearity of the stress-resistance change characteristic of the gauge elements of said second gauge unit, means for fixing said diaphragm at the outer peripheral portion thereof, and connecting means provided to each of the gauge elements of said first and second gauge units.

6. A semiconductor pressure transducer as set forth in claim 5, further comprising means for connecting respective ends of the strain gauge elements of said second gauge unit to one another.

7. A semiconductor pressure transducer as set forth in claim 5, wherein said first gauge unit includes a plurality of such gauge elements which are formed in parallel to said axis and spaced from one another.

8. A semiconductor pressure transducer as set forth in claim 5, further comprising means for combining the gauge elements of said first and second gauge units in the form of a bridge circuit.

9. A semiconductor pressure transducer comprising a pressure-responsive circular diaphragm made of a single crystal of semiconductor material, a first strain gauge unit including at least one strain gauge element formed by injecting am impurity into a linear region extending on a surface of said diaphragm in parallel with a predetermined crystallographic axis and having a piezoresistance effect, a second strain gauge unit including at least one strain gauge element formed by injecting an impurity into a linear region extending on said surface of said diaphragm perpendicular to said axis and having a piezoresistance effect, and means for fixing said diaphragm at the outer peripheral portion thereof, wherein the gauge elements of said first gauge unit are provided at a distance from the center of said diaphragm where the numerical value representing the non-linearity of the stress-resistance change characteristic of said gauge elements has a substantially minimum absolute value while the gauge elements of said second gauge unit are provided at a distance from the center of said diaphragm where the numerical value representing the non-linearity of the stress-resistance change characteristic of said gauge elements is substantially equal in absolute value to and opposite in sign to the numerical value representing the non-linearity of the stress-resistance change characteristic of the gauge elements of said first gauge unit.

* * * * *